US006691300B1

(12) United States Patent
Alexander et al.

(10) Patent No.: US 6,691,300 B1
(45) Date of Patent: Feb. 10, 2004

(54) METHOD AND APPARATUS FOR ANALYZING THE PROGRESS OF A SOFTWARE UPGRADE ON A TELECOMMUNICATIONS SWITCH

(75) Inventors: Eddie Gayle Alexander, Westminster, CO (US); John Cravens Broughton, Littleton, CO (US); Robert Earl Chamberlin, Jr., Lockport, IL (US); Michael Dean Lilley, Missoula, MT (US); Timothy Scott Monkman, Naperville, IL (US); John Frank Saban, Lisle, IL (US); John Patrick Shea, Aurora, IL (US); James Peter Stuht, Arvada, CO (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/430,983

(22) Filed: Nov. 1, 1999

(51) Int. Cl.[7] .................................................. G06F 9/44
(52) U.S. Cl. ......................... 717/113; 717/110; 717/111; 717/121; 717/125; 717/170
(58) Field of Search ................................ 717/113, 125, 717/170, 110, 111, 121

(56) References Cited

U.S. PATENT DOCUMENTS 5,710,899 A * 1/1998 Eick ............................ 345/764

6,078,647 A * 6/2000 D'Eletto ................... 379/32.01

OTHER PUBLICATIONS

Eick et al., "Graphical analysis of computer log files", ACM, pp. 50–56, Dec. 1994.*
McWhirter, "VGrep: a graphical tool for the exploration of textural documents", ACM, pp. 324–325, May 1995.*
La Porta et al., "Direct signaling: a new access signaling architecture", IEEE, pp. 489–501, Aug. 1997.*
Atkins et al., "Using version control data to evaluate the impact of software tools", ACM, pp. 324–333, May 1999.*

* cited by examiner

Primary Examiner—Tuan Q. Dam
Assistant Examiner—Ted T. Vo

(57) ABSTRACT

A method is provided for monitoring the progress of a software upgrade or retrofit on a telecommunications switch (110). A report stream of text messages relating to the state of, and events occurring on, the telecommunications switch is received by a server (102). Predetermined messages are detected in the report stream, including messages indicating entry into a stage of the retrofit, exit from a stage of the retrofit, a failure of a stage of the retrofit, alarms and errors. The time spent in a stage of the retrofit is determined and compared against an expected time (206, 210, 212). A visual portion (300, 400) of a user interface on a client (104) is updated to reflect entry and exit from a stage of the retrofit, and whether the time spent in a stage exceeds an expected time. The user interface reflects occurrences of alarms and errors visually and in some cases audibly.

24 Claims, 4 Drawing Sheets

FIG. 3

Consolidated Status for Southern

File View Help

Southern 304

| OFFICE NAME 308 | COMMIT 312 | END 314 | STATUS 316 | DOWN TIME 318 | NOTES 320 | OFL BOOT ATTEMPTS |
|---|---|---|---|---|---|---|
| CHARLOTTE (SOUTH BLVD) | | | PENDING | | | 0 |
| ORLANDO (AZALEA PARK) | | | PENDING | | | 0 |
| CHARLOTTE (REID ROAD) | | | PENDING | | | 0 |
| SHREVEPORT, LA US UNWIRED | 07/29 01:39<br>07/29 02:29 350 | 07/29 02:59<br>07/29 03:00 | PENDING | | | 2 |
| NEWBERRY | | | PENDING | | | 0 |
| BOWLING GREEN | | | PENDING | | | 0 |
| LEXINGTON (U OF K) | | | PENDING | | | 0 |
| CHATTANOOGA (HARRISON) | | | | | | 0 |

RETRIEVED SCHEDULE DATA FOR NEWBERRY...

METHOD AND APPARATUS FOR ANALYZING THE PROGRESS OF A SOFTWARE UPGRADE ON A TELECOMMUNICATIONS SWITCH

CROSS-REFERENCE TO RELATED APPLICATIONS

The present invention is related to, and shares some disclosure with, U.S. patent application Ser. No. 09/431,741, entitled "Method and Apparatus for Determining Whether the Advance State of A Telecommunications Switch is Adequate for a Software Upgrade," invented by Barshefsky et al., now U.S. Pat. No. 6,393,101; and U.S. patent application Ser. No. 09/430,903, entitled "Method and Apparatus for Determining Whether the Immediate State of a Telecommunications Switch Is Adequate for a Software Upgrade," invented by Lilley et al., U.S. Pat. No. 6,396,904; both of which are filed concurrently with the present application.

FIELD OF THE INVENTION

The present invention relates generally to telephone switching systems, and in particular, to a method and apparatus for analyzing the progress of software upgrades or retrofits on telephone switching systems.

BACKGROUND OF THE INVENTION

Modern telephone switching systems are large-scale, highly complex systems incorporating one or more switching elements cooperatively controlled and supervised by one or more computing means. One commercial exemplar of a modern telephone switching system is the 5ESS ELECTRONIC SWITCHING SYSTEM, from Lucent Technologies Inc., 600 Mountain Avenue, Murray Hill, N.J. 07974. The 5ESS electronic switch is a distributed switching system. Both the switching system capabilities and the control, supervision and administration capabilities are distributed. Each of the computing facilities associated with these distributed capabilities includes appropriate computer programs or software to achieve the desired operation of the switching elements and other components of the switching system.

Periodically the software or computer programs used to control the components of the switching system are replaced by different software. This replacement of computer software is referred to as an upgrade or retrofit. The process of retrofitting a telephone switching system is complex. The complexity stems from the number of distributed computing facilities; the amount of software code involved; and the fact that the switching system availability must not be completely compromised for a retrofit. A typical retrofit of a switch may take from 10 to 12 hours. Resources must be employed days in advance of the retrofit for preparation. And, of course, additional resources are required during the retrofit.

Problems occurring during a retrofit are obviously undesirable. Unfortunately, problems do occur. Some of these problems are readily fixed. Other problems prevent successful upgrade of the switch. Regardless of the nature of the problem, early detection of the problem is desirable. Early detection allows for early correction or rescheduling to avoid wasted resources.

A report data stream is produced by the 5ESS switching system containing text messages regarding the current state and recent operations of the switching system. The report data stream includes messages that (1) describe the state of the switch hardware; (2) report automatic actions taken by the switch; (3) report operations entered by a switch operator; (4) report results of routine or scheduled diagnostics; and (5) indicate non-routine events, abnormal conditions, errors or alarms. The report data stream is typically supplied to a "read-only" printer or "ROP" via a serial port. Hence, the report data stream is often referred to as the "ROP" or "ROP" report. The report data stream is voluminous, sometimes generating 4 to 5 megabytes of data for storage per day. Therefore, the ROP is often stored on a computer to permit searching and review for problem solving. In addition, a telecommunications switch owner often desires to have all ROP output from its switches collected in a single location for review.

The ROP, or its equivalent, is typically reviewed manually or with the assistance of a computer to detect problems during a retrofit of a switch. However, given the voluminous nature of the ROP, especially when considering multiple switches, this method of monitoring a retrofit is prone to miss errors and can be inefficient. Moreover, this method requires substantial subject matter expertise from a person manually reviewing the ROP.

Therefore, a need exists for a more efficient and reliable method and apparatus for monitoring the progress of a software retrofit on a telecommunications switch.

SUMMARY OF THE INVENTION

In accordance with one aspect of the present invention, a method is provided for analyzing and displaying the progress of a software upgrade on a switch. First a report stream containing a plurality of messages associated with the state of the switch is received. The plurality of messages are searched for a select set of messages that are associated with the software upgrade. The select set of messages includes at least a first message associated with an entry into a stage of the software upgrade. The select set of messages includes a second message associated with an exit from the stage of the software upgrade. Preferably, an entry message and an exit message for each stage of the software upgrade are included within the select set of messages. After a message associated with an entry into a stage is detected in the report stream, a user interface is updated to reflect the entry into that stage of the software upgrade. Similarly, when an exit message for a stage is detected in the report stream, the user interface is updated to reflect the exit from that stage of the software upgrade. Preferably, the user interface includes predetermined areas that are visually perceptible and associated with each stage of the software upgrade. Most preferably, the designated visually perceptible areas of the user interface are colored predetermined colors to reflect entry and exit from the stages of the software upgrade.

In accordance with another aspect of the present invention, messages associated with an entry into a stage of the retrofit are timed. That is, a timer is used to determine the actual elapsed time from entry message. The actual elapsed time is compared to an expected time associated with the stage. In this manner, an actual elapsed time from an entry into a stage is compared against an expected time for exit out of the stage. When the actual elapsed time exceeds the expected time associated with the stage, the user interface is updated accordingly to alert a user of a potential problem.

In addition to detecting messages associated with an entry or exit from a stage of the software upgrade, predetermined error messages are detected in the report stream. In general, these predetermined error messages reflect the occurrence of an event on the switch that should not occur during the software upgrade. Upon detection of a predetermined error message, the user interface is updated accordingly to alert a user to an error.

In accordance with another aspect of the present invention, an apparatus or system is provided for monitoring the process of a software upgrade on a telecommunications switch. The apparatus includes a report receiver, a processor, and a user interface. The report receiver receives a stream of messages from the telecommunications switch to thereby produce a received stream of messages. The received stream of messages includes messages reflecting the state of the telecommunications switch. The processor is operably coupled to the report receiver and stores the received stream of messages and searches the received stream of messages for select messages. In particular, the processor searches for select messages indicating an entry into a stage of the software upgrade or messages reflecting an exit from a stage of the software upgrade. As entry messages and exit messages are detected by the processor, a user interface coupled to the processor reflects the entry and exit from the stages of the software upgrade. Preferably, the user interface includes designated areas associated with each stage of the software upgrade and those designated areas are populated with predetermined text streams and colors reflecting entry and exit from the associated stages. Preferably, the user interface includes an audible alarm for alerting a user to certain events associated with the software upgrade, for example, alarms.

In accordance with another aspect of the present invention, the processor includes a timer that times an actual elapsed time from the receipt of an entry message, reflecting entry into a stage of the software upgrade. The actual elapsed time is compared against an expected time and the user interface is updated if the actual elapsed time exceeds the expected time. In addition to detecting messages associated with an entry or exit from a stage of the software upgrade, predetermined error messages are detected and the user interface reflects the detection of the error messages.

BRIEF DESCRIPTION OF THE DRAWINGS

FIG. 3 is a diagram illustrating a visual portion of a user interface for monitoring and analyzing the progress of a software upgrade on a telecommunications switch in accordance with the present invention.

DETAILED DESCRIPTION OF THE PREFERRED EMBODIMENTS

Figure 1:
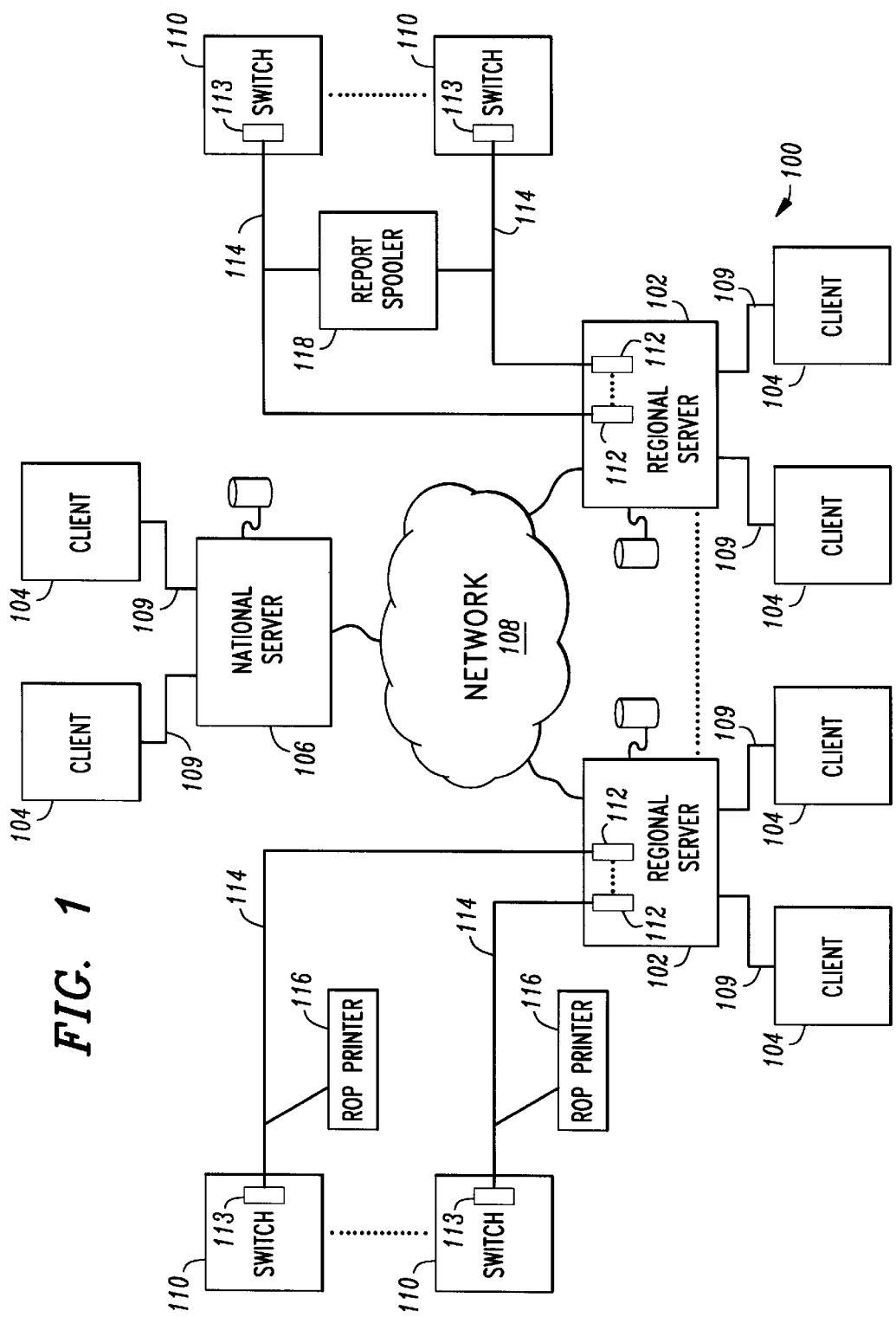
FIG. 1 is a block diagram of a system for monitoring and analyzing the progress of a software upgrade on a telecommunications switch in accordance with the present invention.

FIG. 1 is a block diagram illustrating a system 100 for monitoring and analyzing the progress of a software upgrade on a telecommunications switch in accordance with the present invention. System 100 includes regional servers 102, clients 104, national server 106 and network 108. Network 108 couples national server 106 and regional servers 102 together for data communications in a manner well known to those of skill in the art. Clients 104 are shown in FIG. 1 coupled to a regional server 102 or national server 106 directly by network connections 109. Alternatively, clients 104 are directly coupled to network 108. National server 106, regional servers 102 and clients 104 are general-purpose computers programmed in a manner to implement the present invention, as described further below.

Telecommunications switches 110 are coupled to system 100 to provide system 100 with information relating to the state of the telecommunications switches 110. More specifically, each telecommunications switch 110 produces a report stream 114. Report stream 114 is a serial stream of text messages reflecting the state of the telecommunications switch 110, including error messages, alarms, and other state information. Regional servers 102 include a plurality of modems 112 that are coupled to modems 113 on switches 110. Modems 112 and modems 113 are coupled together selectively over the public switched telephone network to facilitate transmission and reception of report stream 114. The report stream 114 or ROP 114 is also transmitted to a ROP printer 116 or to a ROP spooler 118. ROP spooler 118 typically is a computer that receives ROP 114 and stores ROP 114 for future processing.

In the preferred embodiment, regional servers 102 are coupled to switches 110 to receive ROP 114 prior to a software upgrade. Most preferably, regional servers 102 are coupled to switches 110 six to eight hours prior to the beginning of the software upgrade. Regional servers 102 are preferably geographically disbursed in a region near the associated switches 110. Network 108 provides a means for regional servers 102 to communicate with each other and a national server 106. National server 106, as the name implies, is a centralized national server that is coupled to all regional servers 102. This hierarchical arrangement permits regional servers 102 to monitor switches within its associated region and then for the national server 106 to monitor all regions via connections to the regional servers 102.

National server 106 and regional servers 102 are preferably implemented as a single or multiple general-purpose computers. For example, servers 102, 106 are PENTIUM-class computers running WINDOWS NT with SERVICE PACK 5 from Microsoft Corporation.

Clients 104 are also general-purpose computers with monitors and keyboards provided for engineers and technicians to interface with system 100. For example, clients 104 are PENTIUM-class computers running WINDOWS 95, WINDOWS 98 or WINDOWS NT with SERVICE PACK 5, all from Microsoft Corporation.

Figure 2:
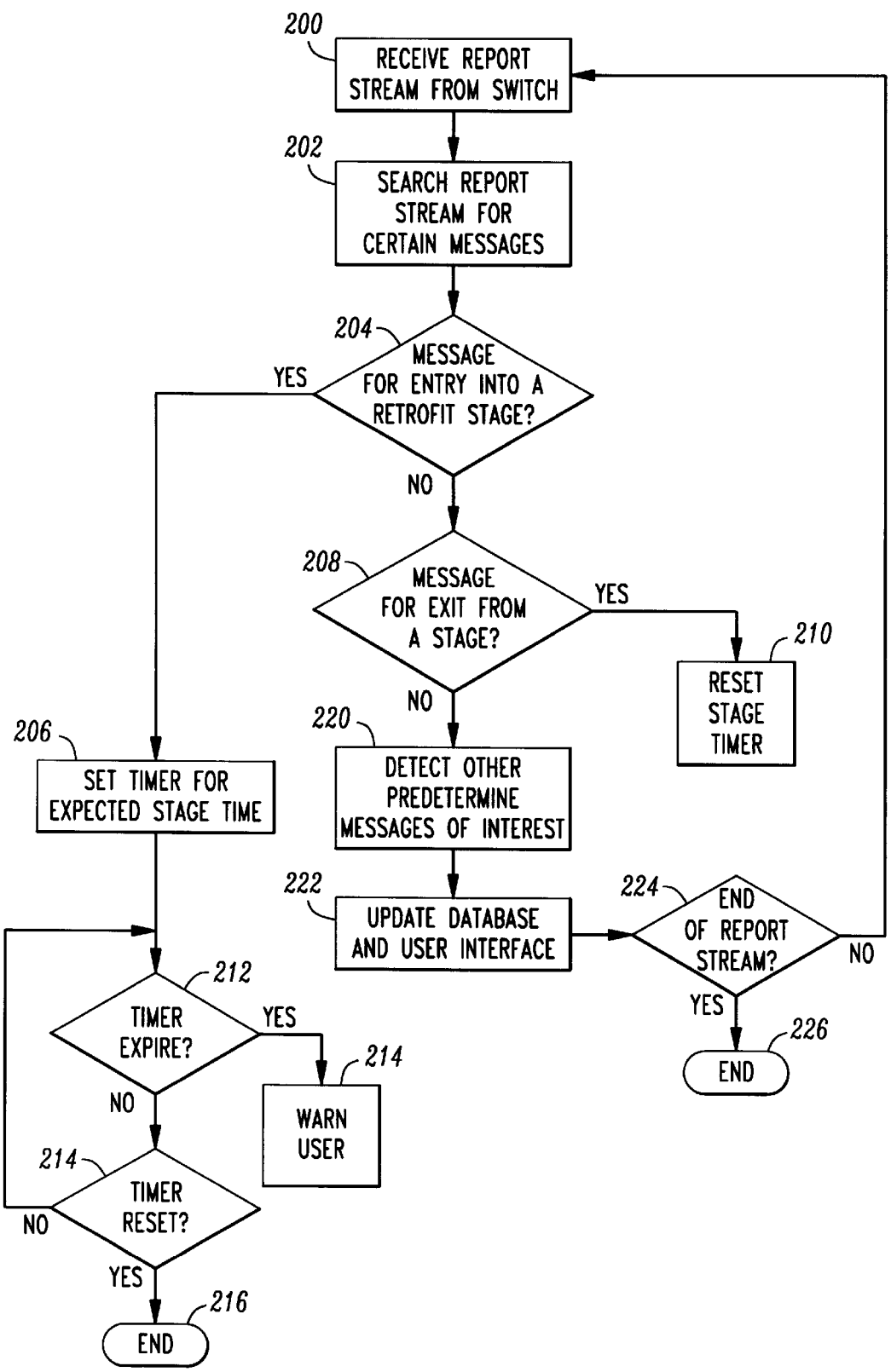
FIG. 2 is a flow chart illustrating a method for monitoring and analyzing the progress of a software upgrade on a telecommunications switch in accordance with the present invention.

FIG. 2 is a flow chart illustrating a method for monitoring and analyzing a software upgrade on a telecommunications switch in accordance with the present invention. FIG. 2 is descried below with reference to the system shown in FIG. 1.

First, the report stream from the switch being monitored is received (200). In particular, modem 112 of regional server 102 receives a stream of text messages reflecting the state of the telecommunications switch 110. The report stream contains text with certain indicia used by regional server 102 to delineate the boundaries for a message.

Server 102 searches the report stream for certain messages. In the preferred embodiment, a database on server 102 or another computer on network 108 stores definitions of certain messages that are relevant to the software upgrade. Certain streams of text found in the report stream indicate the receipt of a message. Preferably, the database is a SYBASE database available from Sybase, Inc., 6475 Christie Avenue, Emeryville, Calif. 94608-1050.

In general, the messages of interest relate to messages that must occur or should not occur during the software upgrade or retrofit. In particular, the software upgrade is delineated into certain distinct stages. In the preferred embodiment relating to the 5ESS electronic switch, the stages of the software upgrade typically include Begin, Enter, Tape, MOP, Pump SM, Pump CMP, TSMOLD, Proceed, OFLBOOT, SWITCH FORWARD, TSMNEW, TSMRMV, STOP OFLBOOT, BOOTHOOK, CORCS, RECENT CHANGE, COMMIT, and END. Begin merely indicates the beginning of the software retrofit. Enter signifies the beginning of the tape loading stage. During the Tape stage, tapes are counted as they are read onto offline partitions of a file system. In the MOP stage, the offline partitions are mounted. In the Pump SM stage the new generic (software) is loaded into the offline side of the switching module. In the Pump CMP stage, the new generic is loaded into the offline side of the communications processor module. In the TSMOLD stage a list of out of service trunks is created and saved. In the Proceed stage the offline side of the administrative module is "pumped" or loaded. The OFLBOOT stage indicates the start of the boot of the administrative module. In the SWITCH FORWARD stage the switch changes from a side running the old generic to a side running the new generic. The TSMNEW stage determines mismatches against the out-of-service list from TSMOLD stage and a previous out-of-service list. The TSMRMV stage makes the out-of-service list of trunks match the list created at the TSMOLD stage. The STOP OFLBOOT stage stops offline boot and restores information on a side of the administrative module. The BOOTHOOK stage updates recent change information on the side running the new generic. In the CORCS stage customer originated recent changes are updated. In the RECENT CHANGE stage recent changes are reapplied. The COMMIT stage restores the switching modules so that both sides are on the new generic and hard drives on the administrative module are restored with the new generic. The END stage indicates the end of the retrofit. Of course, the stages of the retrofit are redefined periodically.

A message is associated with the entry into each stage and the exit from each stage of the retrofit. In some cases, a failure message is associated with a stage. Table 1 below lists exemplary entry, exit, and failure messages for the stages of a software upgrade in the preferred embodiment. In Table 1, the "Stage" column indicates the relevant stage of the retrofit. The "State" column indicates entry, exit (completion), or failure of the associated stage. For example, "Begin" (row 1) indicates entry into the Begin stage; "Begin Complete" (row 2) indicates exit from the Begin stage; and "OFLBOOT failed" (row 19) indicates that the OFLBOOT stage failed. The "Image" column indicates an action to be taken in the user interface in response to receipt of the message. In particular, "1" indicates that a designated area in the user interface associated with the stage should be colored yellow; "2" indicates that the designated area should be colored green; and "3" indicates that the designated area should be colored red. The "Recognition" column lists the message that relates to the state of the associated stage. For example, "REPT RETRO BEGIN RESUME WHEN SESSION HAS STARTED" (row 1) is transmitted in the ROP stream and detected in accordance with the present invention to indicate entry into the Begin stage of the retrofit. The "ProgressID" column includes a number that determines whether the associated stage is displayed in certain views of the user interface. More specifically, a number other than "0" indicates that the stage is displayed in the consolidated status view of the user interface; and "2" indicates that the stage is displayed differently, for example, in a predetermined color, in the user interface.

TABLE 1

| Stage | State | Image | Recognition | ProgressID |
|---|---|---|---|---|
| Begin | Begin | 1 | REPT RETRO BEGIN RESUME WHEN SESSION HAS STARTED | 1 |
| Begin | Begin Complete | 2 | UPD GEN BEGIN COMPLETED SUCCESSFULLY | 1 |
| Enter | Enter | 1 | MOUNT TEXT TAPE FOR MHD 0/1 ON | 1 |
| Enter | Enter Complete | 2 | REPT ENTER HOOK COMPLETED SUCCESSFULLY | 1 |
| Tape | Tape | 1 | UPD GEN ENTER MOUNT TAPE AND CONTINUE | 0 |
| Tape | Tape Loaded | 2 | /updtmp/site/toolxfer/info.out | 0 |
| MOP | MOP | 1 | ISMOP REPORT | 0 |
| MOP | MOP Complete | 2 | REPT PROC SCHED PROCEED PAUSED | 0 |
| Pump SM | Pump SM | 1 | ST:OPUMP,SM | 0 |
| Pump SM | Pump SM Complete | 2 | REPT PROC SCHED PROCEED PAUSED | 0 |
| Pump CMP | Pump CMP | 1 | ST:OPUMP, CMP = 0,MATE | 0 |
| Pump CMP | Pump CMP Complete | 2 | ST OPUMP CMP = 1–0 COMPLETED | 0 |
| TSMOLD | TSMOLD | 1 | REPT RETRO PROCEED CONTINUE | 0 |
| TSMOLD | TSMOLD Complete | 2 | UPD GEN TSM COMPLETED | 0 |
| Proceed | Proceed | 1 | REPT RETRO PROCEED EAI SETUP | 1 |
| Proceed | Proceed Complete | 2 | REPT PROC SCHED SWITCHFWD PAUSED AT STAGE BOUNDARY | 1 |
| OFLBOOT | OFLBOOT | 1 | AM OFFLINE BOOT STARTED | 2 |
| OFLBOOT | OFLBOOT Complete | 2 | EXC OFLBOOT COMPLETED | 2 |
| OFLBOOT | OFLBOOT failed | 3 | OFFLINE BOOT FAILED | 2 |
| OFLBOOT | OFLBOOT failed | 3 | OFLBOOT TERMINATED | 2 |

TABLE 1-continued

| Stage | State | Image | Recognition | ProgressID |
|---|---|---|---|---|
| OFLBOOT | OFLBOOT failed | 3 | ERROR CODE f031 | 2 |
| SWITCH FORWARD | SWITCHFWD | 1 | SWITCHING SMS | 1 |
| SWITCH FORWARD | SWITCHFWD Complete | 2 | SWITCH ONLINE SIDE COMPLETED | 1 |
| SWITCH FORWARD | SWITCHFWD | 3 | ERROR SWITCHING SMS | 1 |
| TSMNEW | TSMNEW | 1 | REPT ALWCHKS STARTING ALWCHKS FOR SM | 0 |
| TSMNEW | TSMNEW Complete | 2 | UPD GEN TSM CADN SUMMARY | 0 |
| TSMRMV | TSMRMV | 1 | TSMRMV | 0 |
| TSMRMV | TSMRMV Complete | 2 | UPD GEN TSM COMPLETED | 0 |
| STOP OFLBOOT | STOP OFLBOOT | 1 | STOP OFLBOOT STARTED | 0 |
| STOP OFLBOOT | STOP OFLBOOT Comp. | 2 | STOP OFLBOOT COMPLETED | 0 |
| BOOTHOOK | BOOTHOOK | 1 | offrcr.out | 1 |
| BOOTHOOK | BOOTHOOK Complete | 2 | BOOT HOOK COMPLETED | 1 |
| CORCS | CORCS | 1 | CNVT CORCLOG LOAD STARTED | 0 |
| CORCS | CORCS Complete | 2 | CNVT CORCLOG LOAD:CONCURRENT CONTROL PROCESS COMPL | 0 |
| RECENT CHANGE | RECENT CHANGE | 1 | RCNEW ODDEVOL STARTED | 1 |
| RECENT CHANGE | RECENT CHANGE | 1 | RC REAPPLICATION CONCURRENT PROCESS STARTED | 1 |
| RECENT CHANGE | RECENT CHANGE Comp. | 2 | RCNEW ODDEVOL COMPLETED | 1 |
| COMMIT | COMMIT | 1 | RETRO COMMIT CONTINUING | 1 |
| COMMIT | COMMIT Complete | 2 | UPD GEN COMMIT COMPLETED | 1 |
| COMMIT | COMMIT Complete | 2 | REPT CMT HOOK COMPLETED SUCCESSFULLY | 1 |
| END | END | 1 | UPD GEN END APP EXECUTING | 1 |
| END | END Complete | 2 | UPD GEN END COMPLETED | 1 |

Server 102 determines whether a message received in the report stream relates to an entry into a retrofit stage (204). If the message does relate to an entry into a retrofit stage then a timer is set with the expected stage time (206), in particular, an expected time is predefined for each stage of the retrofit. This advantageously allows monitoring to determine whether a switch has remained in a stage of the retrofit for too long. This may indicate a problem requiring correction. Preferably, the message associated with entry into the retrofit stage is stored, including a time and date stamp from the report stream that is associated with the message. The message reflecting entry into a retrofit stage is stored for use by the user interface as discussed further below.

As a report stream continues from the switch, the search for predetermined messages continues. Under normal operating procedures associated with a successful software retrofit, sometime after an entry message is received, an exit message associated with an exit from that stage of the retrofit is received. At step 208, a determination is made whether a message is for an exit from a stage of the retrofit. If the exit message is received, the message, including a time and date stamp, is stored for further use. In addition, the stage timer that was set for and upon the entry into that stage is reset (210). Under normal conditions where a stage completes prior to an expected stage time, resetting the stage timer is not detected by a user. On the other hand, if the stage timer expires prior to a reset (212), then a user is warned. In the preferred embodiment, the user is warned by updating the user interface in a predetermined manner, as discussed below. A reset of the stage timer (210) ends the time audit for a particular stage (216).

In addition to messages associated with an entry into, or an exit from, a stage of the retrofit, other messages are detected. Table 2 below lists other exemplary messages that are detected in the preferred embodiment of the invention relating to the 5ESS electronic switch. In general, these messages relate to events that should not occur during a software retrofit. If a message occurs, the database may be updated and a user interface may reflect the change in the database (222). The monitoring process continues until terminated by a user or the report stream ends (224, 226).

Table 2 has three columns entitled "Recognition1," "Recognition2," and "Recognition3." Each of these columns may contain a text stream. The actual ROP message being identified is the Boolean combination of Recognition1 & Recognition2 (if populated) & Recognition3 (if populated) on the same line in the ROP stream. For example, referring to row 1, a combination of "ALW" and "RC" on the same line in the ROP stream is a message of interest to the retrofit process. The "Type" column stores a number that is associated with certain actions that are taken in response to receipt of the identified message. In general, the actions that may occur in response to the messages include, visually updating a user interface, audibly updating a user interface, storing the ROP message in one or more files, and inserting additional text into a file or user interface. The "Text1" column includes text that is displayed in the user interface or stored in a file in response to receipt of the associated message.

TABLE 2

| Recognition1 | Recognition2 | Recognition3 | Type | Text1 |
|---|---|---|---|---|
| ALW: | RC | | | 0 |
| AUD: | | | | 0 |
| BKUP: | ODD | | | 0 |
| CCS TRUNK SIGNALING IN SERVICE | | | | 0 |
| CLR: | AMA | MAPS | | 0 |
| CLR: | FILESYS | | | 0 |
| CLR: | TRN | | | 0 |
| CMTHOOK | COMPLETE | | | 0 |
| CNVT: | AMA | CONFIG | | 0 |
| CNVT: | RCLOG | | | 0 |
| CORCS HAVE BEEN LOG | | | | 0 |
| DFC | ERROR | | | 0 |
| ENDHOOK | COMPLETE | | | 0 |
| ERROR | CAN | | | 0 |
| ERROR | INV | | | 0 |
| EXC OFLBOOT STARTED | | | | 0 |
| EXC: | ENVIR | UPROC | | 0 |
| EXC: | ODDRCVY | | | 0 |
| EXC: | POPCO | | | 0 |
| GLCCS | IS SET TO | | | 0 |
| INH: | CORC | | | 0 |
| INH: | RC | | | 0 |
| INIT: | AM | | | 0 |
| MHD | AUTONOMOUS | | | 0 |
| MNT OFL PTNS OFFLINE PUMP MODECD | COMPLETE | | | 0 |
| OFFLINE PERIPH | DISK | | | 0 |
| OFFLINE PERIPH | ERROR | | | 0 |
| OFFLINE PERIPH | HASH | | | 0 |
| OFFLINE PERIPH | INCON | | | 0 |
| OFFLINE PERIPH | PATH | | | 0 |
| OFFLINE PERIPH | PROB | | | 0 |
| OFFLINE PERIPH | UNAV | | | 0 |
| OFFLINE PERIPH | VERIFY | | | 0 |
| OFFLINE PUMP | DISK | | | 0 |
| OFFLINE PUMP | ERROR | | | 0 |
| OFFLINE PUMP | FAIL | | | 0 |
| OFFLINE PUMP | HASH | | | 0 |
| OFFLINE PUMP | INCON | | | 0 |
| OFFLINE PUMP | PATH | | | 0 |
| OFFLINE PUMP | PROB | | | 0 |
| OFFLINE PUMP | UNAV | | | 0 |
| OFFLINE PUMP | VERIFY | | | 0 |
| OP:GEN | RESET | | | 0 |
| ORD:CPI | | | | 0 |
| REPT | BOOT HOOK COMPLETED | | | 0 |
| REPT | CACHE-ERR | | | 0 |
| REPT | DFC | CODE | | 0 |
| REPT | ISOLATE | | | 0 |
| REPT | MHD 0 UNEQUIPPED | | | 0 |
| REPT | PRCD HOOK COMPLETED | | | 0 |
| REPT | PROCEED PAUSED AT STAGE BOUNDARY | | | 0 |
| REPT | RETRO PROCEED PERFORM | | | 0 |
| REPT DKDRV | | | | 0 |
| REPT RETRO BEGIN | | | | 0 |
| ST:OPUMP | | | | 0 |
| STOP OFLBOOT COMPLETED | | | | 0 |
| STOP: | EXC | ANY | | 0 |
| STOP: | EXC | USER | | 0 |
| STOP:OFLBOOT,RST | | | | 0 |
| STOP:OLFBOOT,RST | | | | 0 |
| STP: | RCRLS | | | 0 |
| STP:OPUMP SUPPORTED | | | | 0 |

TABLE 2-continued

| Recognition1 | Recognition2 | Recognition3 | Type | Text1 |
|---|---|---|---|---|
| RCVS LOGGED: | | | | |
| TCAP SIGNALING | | | 0 | |
| IN SERVICE | | | | |
| TRANSITION SPEC | | | 0 | |
| UPD GEN | AM OFFLINE BOOT SUCCESSFUL | | 0 | |
| UPD GEN | END APP EXECUTING | | 0 | |
| UPD GEN | ENTER | BLOCKS WRITTEN | 0 | |
| UPD GEN | OFFLINE | | 0 | |
| UPD GEN | SELECTED FOR | | 0 | |
| UPD GEN | SWITCHFWD | COMPLETED | 0 | |
| UPD GEN | SWITCHFWD | STARTED | 0 | |
| UPD GEN | TSM | COMPLETE | 0 | |
| UPD GEN | TSM IN PROGRESS | | 0 | |
| UPD:BKOUT | | | 0 | |
| UPD:BOLO | | | 0 | |
| UPD:EXALL | APPLY | | 0 | |
| UPD:EXALL | OFC | | 0 | |
| UPD:EXALL | SOAK | | 0 | |
| UPD:GEN | APPLPROC | "MOP" | 0 | |
| UPD:GEN | APPLPROC | APPLY | 0 | |
| UPD:GEN | APPLPROC | HOOK | 0 | |
| UPD:GEN | APPLPROC | MODECD | 0 | |
| UPD:GEN | APPLPROC | STOPMOP | 0 | |
| UPD:GEN | APPLPROC | TOOLS | 0 | |
| UPD:GEN | APPLPROC | TSMNEW | 0 | |
| UPD:GEN | APPLPROC | TSMOLD | 0 | |
| UPD:GEN | APPLPROC | TSMRMV | 0 | |
| UPD:GEN | APPLPROC | WRTAMA | 0 | |
| UPD:GEN | BACKOUT | | 0 | |
| UPD:GEN | CONTINUE | | 0 | |
| UPD:GEN | SMBKOUT | | 0 | |
| UPD:GEN | STOPOLB | | 0 | |
| UPD:GEN | SWITCH | | 0 | |
| UPD:UPNAME | | | 0 | |
| WRT:AMADATA | | | 0 | |
| UPD:GEN | BEGIN | | 1 | |
| MOUNT | FOR MHD | AND RESUME | 2 | |
| UPD GEN | ENTER | MOUNT TAPE AND CONTINUE | 2 | |
| STOP: | GEN | | 3 | |
| UPD:GEN | RESTORE | | 3 | |
| UPD:GEN | ENTER | | 4 | |
| UPD:GEN | MHDSTAT | | 4 | |
| EXT-BOARD-ADDR | | | 5 | |
| CNVT | CORCLOG | STOPPED | 6 | |
| MOVELOG | | | 6 | |
| REPT | POPCO | | 6 | |
| SUPR ERROR CODE | | | 6 | |
| CNVT: | CORC | | 7 | START CORCs |
| EXC: | RCRLS | EVOL | 7 | START RECENT CHANGE |
| EXC: | RCRLS | OSPS | 7 | START RECENT CHANGE |
| RCNEW ODDEVOL COMPLETED | | | 7 | RECENT CHANGE COMPLETE |
| RCNEW ODDEVOL STOP | | | 7 | RECENT CHANGE COMPLETE |
| START OF CU | RECOVERY | | 7 | BOOT START of CU RECOVERY |
| RCNEW ODDEVOL ABORT | | | 8 | RECENT CHANGE COMPLETE |
| DATE = | | | 9 | *****BASE # |
| PROCESSOR: | CP | | 9 | ***** AM ODD |
| PROCESSOR: | IM | | 10 | |
| UPD:GEN | APPLPROC | LOOKODD | 11 | |
| REPT | CORR-BIT-ERR | | 12 | |
| REPT | MEM-SYSTEM | | 12 | |
| REPT | PARITY-ERROR | | 12 | |
| REPT | HASHSUM FAILURE | | 13 | |
| CNVT | CORCLOG | LOAD SM = | 14 | |
| CORCS | IN ERROR | | 15 | |
| BOOTHOOK | COMPLETE | | 16 | BOOTHOOK COMPLETE |
| CONCURRENT CONTROL PROCESS COMPLETED | | | 16 | CORCs COMPLETE |
| ENTRHOOK | COMPLETE | | 16 | ENTRHOOK COMPLETED |

TABLE 2-continued

| Recognition1 | Recognition2 | Recognition3 | Type | Text1 |
| --- | --- | --- | --- | --- |
| INSTALLTOOLS | COMPLETE | | 16 | INSTALLTOOLS COMPLETE |
| MODIFY | COMPLETE | | 16 | MODIFY COMPLETE |
| PRCDHOOK | COMPLETE | | 16 | PRCDHOOK COMPLETE |
| UPD GEN | COMMIT | COMPLETED | 16 | COMMIT STAGE COMPLETE |
| UPD GEN | ENTER | COMPLETED | 16 | TAPE LOAD COMPLETE |
| UPD GEN | PROCEED | COMPLETED | 16 | PROCEED STAGE COMPLETE |
| UPD:GEN | COMMIT | | 16 | START COMMIT STAGE |
| UPD:GEN | END | | 16 | END STAGE |
| UPD:GEN | PROCEED | | 16 | START PROCEED STAGE |
| BACKOUT-RC | | | 18 | Fix RC BACKOUT before RC reapp starts (RC/DB) |
| STOPPED WITH ERROR CODE | | | 19 | |
| REPT RETROFIT TOTAL SYSTEM DOWNTIME | | | 21 | |
| DOWNTIME | | | 22 | |

In addition to the exemplary messages listed above, other messages are detected. In particular, in the preferred embodiment, messages referred to as processor recovery messages or PRMs are received from the administrative module. These messages are a string of 16 hexadecimal numbers. Certain of the messages are detected and the system responds by visually updating a user interface, audibly updating a user interface, storing the ROP message in one or more files, or inserting additional text into a file or user interface. Actions taken in response to PRMs convert the cryptic hexadecimal code into a message or sound that is readily perceived by a person. In some cases, multiple lines of a ROP message are parsed to determine a message stored and displayed in a user interface.

The method described above is preferably implemented with software running on servers 102, 106 and clients 104. The core monitoring application is preferably a multi-threaded NT service written in C++. This core monitoring application manages the connections to the switches 110, collects and stores data from the switches 110, and performs the analysis. For example, In order to connect to a switch, the server spawns a thread for that switch. All monitoring activities for that switch take place within the thread. Internal communications between applications is preferably accomplished using TCP/IP sockets. Data used to control the application, e.g., the predetermined messages, and data stored from the application, e.g., the identified messages, are stored in a database. A C++ library that encapsulates the database primitives provides application access to the database. The user interface is preferably a Microsoft Visual C++ application.

FIG. 3 is a diagram illustrating a visual portion of a user interface for displaying the progress of a software upgrade on a telecommunications switch in accordance with the present invention. Preferably, the user interface is implemented on a client 104. Client 104 preferably has software that accesses the database on a server 102, 106 and reflects changes made in the database in a visually aesthetic manner. Preferably, the user interface is displayed on a computer monitor.

Display 300 is a consolidated status display. Display 300 collectively shows in one screen the progress of multiple switches or offices undergoing a software upgrade. Display 300 includes a tool bar area 302, with short cuts or buttons for selecting certain commands, including commands to connect to and disconnect from a regional server 102 or national server 106. A region area 304 displays a label associated with the particular region being monitored, in this example, the "Southern" region. The display 300 is characterized by a set of columns and rows. Column 306 labeled "HC" relates to a "health check" conducted prior to the retrofit progress. The "health check" is performed prior to the retrofit to determine whether to proceed with the retrofit. This determination is described in co-pending patent applications referred to above in the cross-reference to related applications.

Column 308 includes the name of the office or switch. In other words, column 308 lists the particular switch that is scheduled for a retrofit, generally by geographical designation. Columns 312, 314, 316, 318, 320 and 324 list certain stages of the retrofit and other pertinent fields relating to the retrofit. Column 312 relates to the COMMIT stage and column 314 relates to the END stage. Other stages are preferably displayed by scrolling horizontally in display 300. Column 316 gives the status of the retrofit. The status column is populated with "Pending," "Succeed," "Failure" or "Abort." Pending indicates the office will retrofit within five to seven days; Succeed indicates the retrofit was successful; Failure indicates the retrofit was not successfully completed; and Abort indicates the office retrofitted, but returned to the old generic. Column 318 relates to the down time associated with the retrofit; column 320 lists the time of the most recent note entered, if any; and column 324 lists the number of OFL boot attempts. Each row of display 300 relates to the switch or office listed in column 308.

The area defined by the intersection of a column relating to a stage of the retrofit and a row related to a particular office being retrofit is used to display information associated with that particular stage of the retrofit. For example, in FIG. 3, area 350, which is the intersection of column 312 and row 332, relates to the commit stage of the retrofit for the Shreveport, Louisiana office listed in column 308, row 332. In the preferred embodiment, as shown in box 350, a date and time associated with the entry into the commit stage is listed in area 350 and a date and time associated with the exit out of the commit stage is shown below the entry data in area 350. Area 350 is colored a predetermined color to indicate certain status relating to the associated stage of the retrofit at the associated office. In the preferred embodiment, a background color of green is used to reflect no errors found in the associated stage of the retrofit. A flashing yellow background, that is alternating between yellow and another color, or the lack thereof, is used to indicate that a stage has exceeded a predetermined expected stage time. A nonflashing yellow background color indicates the stage is in progress and has not exceeded an expected time. A red color is used to indicate that an error occurred during the associated stage at the associated office. A blue color is used to indicate the OFLBOOT stage. Other colors are optionally used.

The area of the user interface containing the name of the office preferably reflects general status about the office. In particular, this area preferably flashes red to indicate a major or critical alarm at an office. Selecting any stage box, for example, by double clicking on the stage box, causes the user interface to display a status display for the selected office. A stage box is defined by the intersection of a column relating to a retrofit stage and a row relating to a particular office or switch. The status display is discussed below with respect to FIG. 4. Selecting a row in the notes column 320 causes the user interface to display a window containing a note if one exist.

Figure 4:
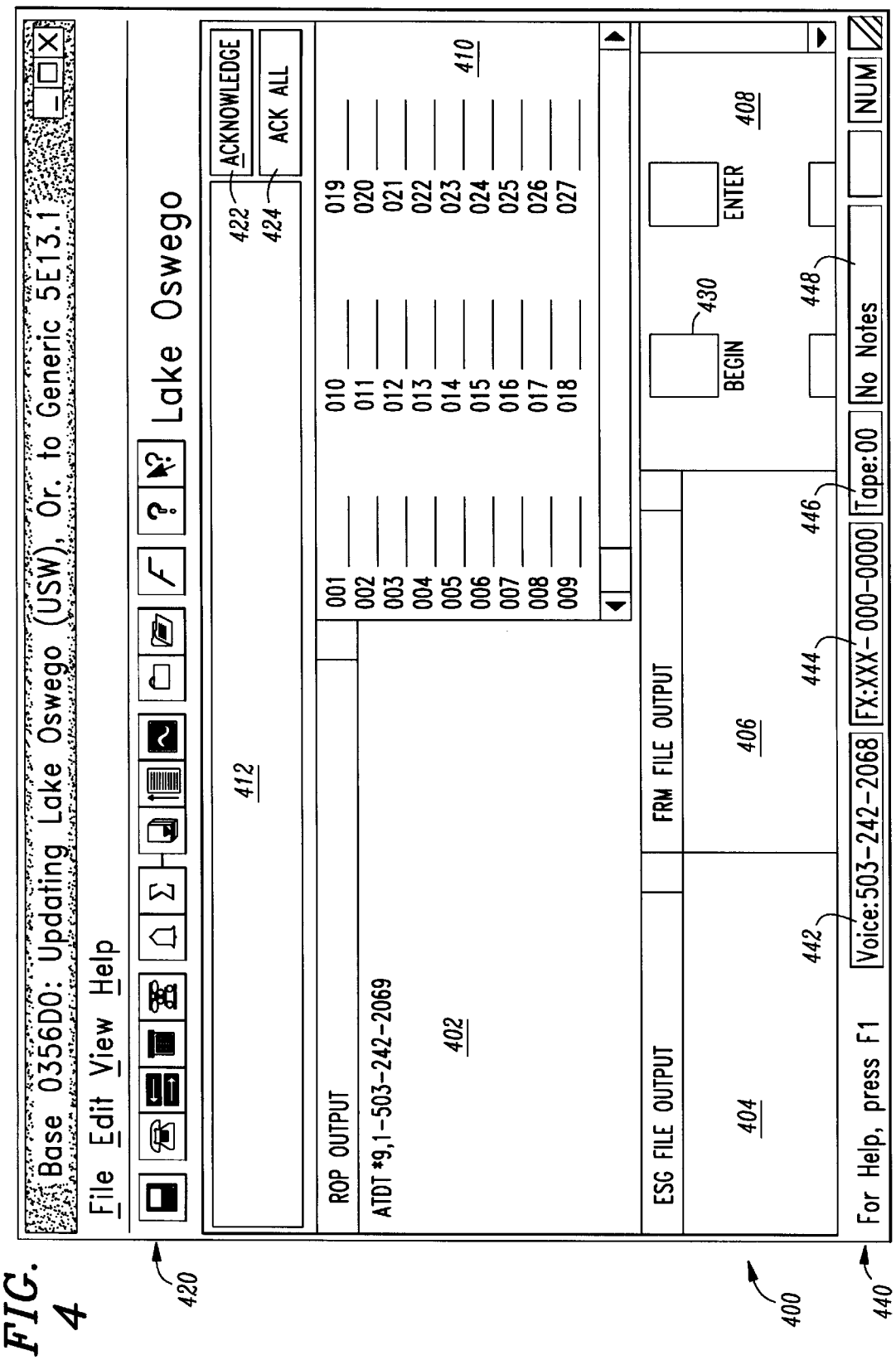
FIG. 4 is a diagram illustrating an additional visual portion of a user interface for monitoring and analyzing the progress of a software upgrade on a telecommunications switch in accordance with the present invention.

FIG. 4 shows a status display 400 relating to the progress of a retrofit for a single switch or office. Status display 400 provides additional details associated with a certain office in designated areas or panes. In particular, display 400 includes a ROP output pane 402, a MSG file output pane 404, an FRM file output pane 406, a stage pane 408, a switch pump pane 410 and an alarm pane 412. Display 400 also includes a toolbar 420, which displays icons for certain commands, and a status bar 440, which includes additional status.

ROP output pane 402 displays the text stream from the ROP as it is received and stored in a log file. The text in the pane scrolls as additional text is received, but is paused by selecting a pause command in toolbar 420.

The MSG file output pane 404 displays messages written to a .msg file. The .msg file contains alarm messages received in the ROP for the switch during monitoring. Alarms are indications of events on the switch that may require corrective action. Alarms fall into three categories reflecting their level of severity—minor, major, or critical.

The FRM output pane 406 displays output written to a form file for the office. The form file is written in response to the receipt of predetermined messages. The form file contains, for example, the entry and exit messages for each stage, failing processor recovery messages (PRMs), errors and other predetermined messages. The form file is useful to diagnose problems.

The alarm pane 412 displays the most recent alarm message. Alarm pane 412 is preferably colored green for minor alarms, yellow for major alarms and red for critical alarms. There is and acknowledge button 422 and an "ACK all" button 424 in the alarm pane. The acknowledge button 422 is used to acknowledge the occurrence of the current alarm. The ACK all button is used to acknowledge all pending alarms. The buttons 422, 424 are made inactive when no alarms are pending. Alarms also cause an audible sound, with the sound varying with the severity of the alarm.

The switch pump pane 410 indicates when each switching module is "pumped" or completed. The word "pumped" appears next to the switching module number when the associated switching module is pumped. If there are errors in the pump process, the errors are indicated, rather than the word "pumped."

The stage pane 408 shows the progress of the office through the stages of the retrofit. An area or stage square 430 is provided for each stage with the name of the stage designated below the square 430. The stage square 430 is colored a predetermined color to reflect the status of the stage of the retrofit. Preferably, green indicates that the stage is complete; yellow indicates the stage is in progress; red indicates the stage failed; and blue indicates offline boot is running or OFLBOOT is in progress.

Display 400 includes a status bar 440 that includes additional status information. In particular, section 442 contains a voice phone number associated with the office; section 444 contains a foreign exchange number associated with the switch; section 446 indicates which retrofit tape is being loaded; and section 448 indicates whether notes have been entered for the office.

The present invention includes a system for regional and national monitoring of retrofits on telecommunication switches. Retrofit monitoring advantageously allows for early problem detection and correction to efficiently utilize resources during a retrofit. Centralized retrofit monitoring advantageously allows for ready and remote diagnoses of problems due to expertise gained from previous retrofit monitoring. Though described above with respect to telecommunications switching systems, the retrofit monitoring process may equally apply to software upgrades on other processor-based systems.

The invention being thus described, it will be evident that the same may be varied in many ways. Such variations are not to be regarded as a departure from the spirit and scope of the invention and all such modifications are intended to be included within the scope of the appended claims.

What is claimed is:

1. A method for analyzing the progress of a software upgrade on a switch comprising the steps of:

A) receiving a report stream from the switch, wherein the report stream includes a plurality of messages associated with a state of the switch;

B) searching the plurality of messages for a select set of messages associated with the software upgrade, wherein the select set of messages includes a first message associated with an entry into a stage of the software upgrade, and a second message associated with an exit from the stage of the software upgrade;

C) detecting the first message; and

D) updating a user interface to reflect the entry into the stage of the software upgrade in response to detecting the first message.

2. The method of claim 1 further comprising the steps of:

E) detecting the second message; and

F) updating the user interface to reflect the exit from the stage of the software upgrade.

3. The method of claim 1 further comprising the steps of:

E) in response to detecting the first message, initiating a timer to count an actual elapsed time;

F) comparing the actual elapsed time to an expected time associated with the stage;

G) detecting when the actual elapsed time exceeds the expected time associated with the stage;

H) updating the user interface to reflect that the stage has exceeded the expected time when the actual elapsed time exceeds the expected time and the second message has not been received.

4. The method of claim 1 further comprising the steps of:

E) detecting a predetermined error message in the plurality of messages, wherein the predetermined error message reflects the occurrence of an event that should not occur during the software upgrade; and F) updating the user interface to reflect the occurrence of the predetermined error message.

5. The method of claim 1 wherein the step of receiving the report stream includes receiving the report stream as the report stream is generated by the switch.

6. The method of claim 5 wherein the report stream is a serial stream of text messages.

7. The method of claim 6 wherein the report stream is received via a modem.

8. The method of claim 5 wherein the report stream is received via a network.

9. The method of claim 6 wherein the text messages include messages that must occur during a successful software upgrade.

10. The method of claim 6 wherein the text messages include one of alarms and errors.

11. The method of claim 1 wherein the user interface includes a designated area associated with the stage, wherein the designated area is visually perceptible.

12. The method of claim 11 wherein the designated area is colored a first predetermined color when the user interface is updated to reflect the entry into the stage of the software upgrade.

13. The method of claim 2 wherein the user interface includes a designated area associated with the stage, wherein the designated area is visually perceptible, and wherein the designated area is colored a first predetermined color when the user interface is updated to reflect the exit from the stage of the software upgrade.

14. The method of claim 3 wherein the user interface includes a designated area associated with the stage, wherein the designated area is visually perceptible, and wherein the designated area is colored alternatively a first predetermined color and a second predetermined color when the user interface is updated to reflect that the stage has exceeded the expected time.

15. The method of claim 1 wherein the user interface includes an audible alarm.

16. An apparatus for monitoring progress of a software upgrade on a telecommunications switch comprising:
  a report receiver that receives a stream of messages from the telecommunications switch to produce a received stream of messages, wherein the stream of messages includes a plurality of messages reflecting a state of the telecommunications switch;
  a processor coupled to the report receiver that stores the received stream of messages and searches the received stream of messages for select messages, wherein the select messages includes a first message reflecting an entry into a stage of the software upgrade and a second message reflecting an exit from the stage of the software upgrade;
  a user interface that is coupled to the processor to reflect a receipt of the first message by the report receiver.

17. The apparatus of claim 16 wherein the user interface reflects a receipt of the second message by the report receiver.

18. The apparatus of claim 16 wherein the processor further comprises a timer that times an actual elapsed time from the receipt of the first message and the user interface reflects that the actual elapsed time exceeded an expected time when the actual elapsed time exceeds the expected time before a receipt of the second message.

19. The apparatus of claim 16 wherein the select messages include a predetermined error message and the user interface reflects a receipt of the predetermined error message by the report receiver.

20. The apparatus of claim 16 wherein the select messages include messages that must occur during a successful software upgrade.

21. The apparatus of claim 16 wherein the user interfaces comprises an audible alarm.

22. The apparatus of claim 16 wherein the user interface comprises a designated area associated with the stage, wherein the designated area is visually perceptible, and wherein the designated area is colored a predetermined color to reflect the receipt of the first message by the report receiver.

23. The apparatus of claim 17 wherein the user interface comprises a designated area associated with the stage, wherein the designated area is visually perceptible, and wherein the designated area is colored a predetermined color to reflect the receipt of the second message by the report receiver.

24. The apparatus of claim 18 wherein the user interface comprises a designated area associated with the stage, wherein the designated area is visually perceptible, and wherein the designated area is alternatively colored a first predetermined color then a second predetermined color to reflect when the actual elapsed time exceeds the expected time before the receipt of the second message.

* * * * *